United States Patent [19]

Harms et al.

[11] Patent Number: 4,668,898

[45] Date of Patent: May 26, 1987

[54] ELECTRONICALLY COMMUTATED MOTOR

[75] Inventors: Harold B. Harms; Peter B. Lytle, both of Fort Wayne, Ind.

[73] Assignee: General Electric Company, Fort Wayne, Ind.

[21] Appl. No.: 853,889

[22] Filed: Apr. 21, 1986

[51] Int. Cl.$^4$ .................. H02K 29/00; H02K 9/28
[52] U.S. Cl. .................. 318/254; 310/67 R; 310/68 D; 310/68 R; 310/227
[58] Field of Search .................. 318/138, 254, 439; 310/52, 68 R, 227, 68 D, 62, 63, 67 R

[56] References Cited

U.S. PATENT DOCUMENTS

| | | | |
|---|---|---|---|
| 3,041,484 | 6/1962 | Freer et al. | 310/68 D |
| 3,530,350 | 9/1970 | Gawron et al. | 318/138 X |
| 3,531,702 | 9/1970 | Hill | 318/138 |
| 3,562,564 | 2/1971 | Potter | 310/68 D |
| 3,569,804 | 3/1971 | Studer | 318/254 X |
| 3,604,960 | 9/1971 | Krestel | 318/254 A X |
| 3,644,765 | 2/1972 | Janson | 318/254 A X |
| 3,673,447 | 6/1972 | Zumbach et al. | 310/227 |
| 4,099,104 | 7/1978 | Muller | 318/138 |
| 4,156,168 | 5/1979 | Vogel | 318/138 |
| 4,162,414 | 7/1979 | Takabatake | 310/68 R |
| 4,162,435 | 7/1979 | Wright | 318/254 X |
| 4,169,990 | 10/1979 | Erdman | 318/254 X |
| 4,204,810 | 5/1980 | Vogel | 417/244 |
| 4,286,186 | 8/1981 | Hagenlocher et al. | 310/89 |
| 4,286,198 | 8/1981 | Valroger | 318/138 |
| 4,288,711 | 9/1981 | Hagenlocher et al. | 310/68 D |
| 4,390,826 | 6/1983 | Erdman et al. | 318/254 X |
| 4,494,055 | 1/1985 | Bitting et al. | 318/138 X |
| 4,554,473 | 11/1985 | Muller | 310/68 R X |
| 4,556,827 | 12/1985 | Erdman | 318/138 X |
| 4,558,245 | 12/1985 | Glasauer et al. | 310/68 R X |

FOREIGN PATENT DOCUMENTS 55-63549  5/1980  Japan ..................... 310/52

OTHER PUBLICATIONS

Robbins & Myers brochure entitled "Brushless D.C. Motors and Motor Parts Sets" bearing a copyright notice dated 1982.

Primary Examiner—William M. Shoop, Jr.
Assistant Examiner—Bentsu Ro
Attorney, Agent, or Firm—Ralph E. Krisher, Jr.

[57] ABSTRACT

An electronically commutated motor has a printed circuit board with opposite sides and a heat dissipating means arranged in spaced apart relation at least in part in the path of at least some of the cooling circulated in the electronically commutated motor by the rotatable assembly thereof. A plurality of insulated gate transistors are located on the heat dissipating means in heat transfer relation therewith adjacent one opposite side of the printed circuit board and are operable to commutate power supplied to the winding stages of the electronically commutated motor. Other solid state components for controlling the conductivity of the insulated gate transistors are located on the other opposite side of the printed circuit board, and the insulated gate transistors and the other solid state components are connected in circuit relation with the printed circuit board.

18 Claims, 9 Drawing Figures

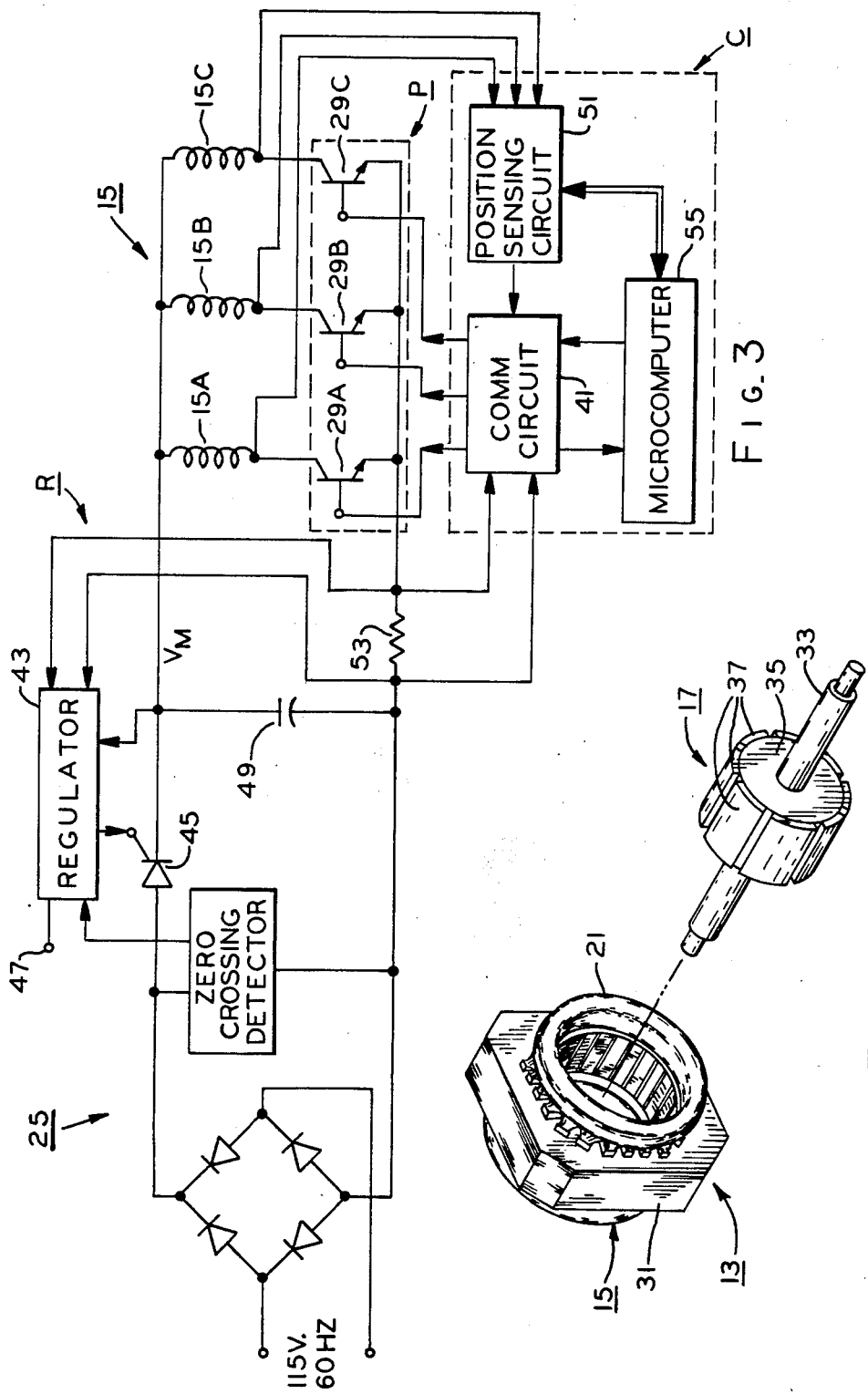

ELECTRONICALLY COMMUTATED MOTOR

FIELD OF THE INVENTION

This invention relates in generally to dynamo-electric machines and in particular to an electronically commutated motor (hereinafter sometimes referred to as an ECM).

BACKGROUND OF THE INVENTION

In the past, various different types of electronic circuitry have been utilized for controlling the electronic commutation of an ECM, and at least for the most part, such electronic circuitry was in the form of solid state components. Electronic circuitry of the solid state type enabled the versatility of the ECM to be employed in various different types of applications therefor particularly where variable speed and/or variable torque requirements existed. Generally speaking, the electronic circuitry for an ECM comprises a power circuit having solid state switching devices for commutating the power supplied to the ECM to effect its energization, a regulating circuit having various solid state components for maintaining the power supplied to the ECM generally constant, and a control circuit having various solid state components for controlling the conductivity of the switching devices. The disclosures in the various patents enumerated hereinafter are merely representative of the various different approaches employed in the utilization of the ECM and different electronic circuitry therefor as a drive in various different exemplary applications or systems, both of the relatively low power type and high power type.

For instance, in U.S. Pat. No. 4,494,055 assigned to the General Electric Company, a relatively low power application for an ECM driven fan adapted for household use is disclosed having a housing positioned at one end of the ECM and containing the electronic circuitry therefor. In this low power ECM fan drive application, power leads are passed through the ECM into the aforementioned housing at one end thereof to be terminated with the electronic circuitry contained in such housing, and the electronic circuitry is disposed on a printed circuit board secured to such housing. The electronic circuitry includes a regulating circuit, monolithic integrated control circuits which provide drive signals to relatively low power switching transistors of a power circuit. The components of the regulating circuit, the control circuits and the power circuit are all mounted in circuit relation on the aforementioned printed circuit board since the power conducted by the switching transistors is relatively low and, therefore, the heat dissipation from such low power switching transistors is also relatively low being effected through small heat sinks integral with each switching transistor.

In comparison with the above discussed application of the relatively low power ECM and electronic circuitry therefore, the particular applications for the ECM and electronic circuitry therefor of the present invention are of the aforementioned higher power type, and if a more detailed discussion of the construction and operation of such higher power ECM and electronic circuitry therefor is desired, reference may be had to U.S. Pat. Nos. 4,169,990 and 4,556,827 issued to Daniel M. Erdman and U.S. Pat. No. 4,162,435 issued to Floyd H. Wright, all of which are assigned to the General Electric Company. Generally speaking, an ECM has a multi-stage winding assembly and a magnetic assembly associated for relative rotation, and in a given state of energization sequence for the winding stages of the multi-stage winding assembly, the ECM has at least one unenergized winding stage in which an induced back EMF appears. When integrated over time to a predetermined value, the aforementioned induced back EMF indicates the instant at which the relative angular position between the multi-stage winding assembly and the magnetic assembly upon the relative rotation thereof has been attained suitable for the sequential commutation of the next winding stage.

In one example of a past ECM, the magnetic assembly was rotatable with respect to a stationary multi-stage winding assembly, and in another exemplary past ECM, the multi-stage winding assembly was rotatable relative to a stationary magnetic assembly; however, it is believed that such past ECMs may have made many of the same requirements of the electronic circuitry therefor and that such electronic circuitry may have been equally applicable to such past ECMs. Further, while the more common past magnetic assembly for an ECM is believed to have been a permanent magnet assembly, another of such past magnetic assemblies has been an electro-magnet; however, it is believed that both of such past magnetic assemblies may have made many of the same requirements of the electronic circuitry for the ECM utilizing such past magnetic assemblies and that such electronic circuitry may have been equally applicable to the ECM utilizing either of such past magnetic assemblies.

With respect to the past higher power applications or heavy duty applications of past ECMs and the electronic circuitry therefor, as previously mentioned, such past ECM has been employed to drive apparatus having much greater torque and/or speed requirements, such as for instance a laundry machine or a blower fan for use in commercial or large scale air conditioning units or the like. In these past higher power applications, the switching transistors utilized in the power circuit for commutating the power supplied to the winding stages of the ECM were required to conduct exceedingly large currents in order to provide appropriate levels of power to the ECM to effect its operation in a suitable manner. In certain of these past higher power applications, by way of example a laundering application as disclosed in U.S. Pat. No. 4,556,827, the ECM was periodically called upon to provide relatively high torques. In the aforementioned laundering application, this high torque requirement occurred during the rotation reversals of ECM to effect agitation of the laundering basket during a wash mode operation. During a spin mode operation, the initial energization of the ECM may have required exceedingly large currents in order to initiate a spin rotation of the laundering basket and thereby effect centrifugal extraction of water from wet clothes contained in the laundering basket, but thereafter the ECM was capable of operating at relative higher speeds and lower currents. Depending upon the size of the laundering apparatus, it is believed that the ECM utilized to drive it may have been in the range of between about $\frac{1}{4}$ to $\frac{1}{2}$ horsepower, and in the past higher power application for driving a blower for an air conditioning unit, it is believed that the ECM utilized to drive it may have been in the range of between about 1/6 to $\frac{1}{4}$ horsepower.

In the above discussed past higher power applications of the ECM and electronic circuitry therefor as well as other past higher power applications, the solid state switching devices in the power circuit for controlling the switched current between the winding stages of the ECM must be of a relatively large size in order to conduct the current magnitude associated with the higher horsepower ECM, and means must be provided for adequately dissipating the heat generated within such relatively large sized switching devices by virtue of such large currents passing therethrough. By way of contrast with the above discussed past lower power application utilizing lower power switching transistors, it is believed that the switching devices utilized in the past higher power applications must be capable of handling several orders of magnitude of current larger than that handled by such lower power switching transistors. Therefore, it is desirable not only to provide a means for dissipating the heat generated by the aforementioned higher power solid state switching devices but also to provide a means for positioning the power circuit, the regulating circuit and the control circuit at the ECM in order to avoid having multiple wiring connections running for relatively long distances between such circuits and the ECM.

In some higher power applications of the ECM and electronic circuitry therefor, it may also be desirable to incorporate the power circuit, the regulating circuit and the control circuit within a housing for the ECM; however, in this type of arrangement, it is believed that the heat generated by the solid state switching devices of the power circuit may be of such a magnitude as to endanger the solid state components of the regulating circuit and the control circuit unless the heat generated by such switching devices is adequately dissipated.

SUMMARY OF THE INVENTION

Among the several objects of the present invention may be noted the provision of an improved ECM; the provision of such improved ECM having a printed circuit board interconnecting its electronic circuitry and with a control circuit and a regulating circuit thereof being supported on one opposite side of the printed circuit board and a power circuit of the electronic circuitry being located adjacent the other opposite side of the printed circuit board in heat sink relation with a means for dissipating heat; the provision of such improved ECM wherein the power circuit of such electronic circuitry has a plurality of solid state components with some thereof comprising insulated gate transistors; the provision of such improved ECM in which the solid state components of the power circuit are encased within a casing of thermally conductive material with the casing being engaged in heat sink relation with the heat dissipating means and disposed adjacent the other opposite side of the printed circuit board; the provision of such improved ECM having means for supporting the heat dissipating means and the printed circuit board in spaced apart relation and for connecting the heat dissipating means in heat sink relation with a stationary assembly of the ECM within a housing therefor; the provision of such improved ECM having a thermally conductive enclosure mounted to one end thereof with the thermally conductive enclosure supporting therewithin both the printed circuit board and the heat dissipating means with the heat dissipating means being connected in heat sink relation to the thermally conductive enclosure; and the provision of such improved ECM having blower means mounted to the thermally conductive enclosure exteriorly thereof for effecting forced air circulation over the thermally conductive blower. These as well as other objects and advantageous features of the present invention will be in part apparent and in part pointed out hereinafter.

In general and in one form of the invention, an ECM is provided with a stationary assembly including a multi-stage winding arrangement having a plurality of winding stages adapted to be electronically commutated in at least one preselected sequence. A rotatable assembly is associated with the stationary assembly and arranged in selective magnetic coupling relation with the winding stages so as to be rotatably driven in response to the electronic commutation of at least some of the winding stages in the at least one preselected sequence to effect the circulation of cooling air in at least a part of the ECM. Means for dissipating heat is arranged at least in part in the path of at least some of the cooling air circulated by the rotatable assembly, and a printed circuit board is arranged in adjacent spaced relation with the heat dissipating means. The printed circuit board has a pair of generally opposite sides and is arranged at least in part the path of at least some of the cooling air circulated by the rotatable assembly. Means for controlling the electronic commutation of the at least some winding stages in the at least one preselected sequence includes a plurality of solid state components connected in circuit relation with the printed circuit board, some of the solid state components comprising insulated gate transistors located on the heat dissipating means in heat transfer relation therewith and spaced adjacent one of the opposite sides of the printed circuit board and other ones of the solid state components being located on the other of the opposite sides of the printed circuit board.

BRIEF DESCRIPTION OF THE DRAWINGS

FIG. 2 is an exploded perspective view of a stationary assembly and a rotatable assembly of the ECM of FIG. 1 with the housing parts of the ECM removed for clarity;

FIG. 3 is a diagrammatic illustration of exemplary electronic circuitry which may be utilized with the ECM of FIG. 1;

Corresponding reference characters refer to corresponding parts throughout the several views of the drawings.

The exemplification set out herein illustrate the preferred embodiments of the present invention in one form thereof, and such exemplifications are not to be construed as limiting either the scope of the invention or the scope of the disclosure thereof in any manner.

DETAILED DESCRIPTION OF THE PREFERRED EMBODIMENTS

Figure 1:
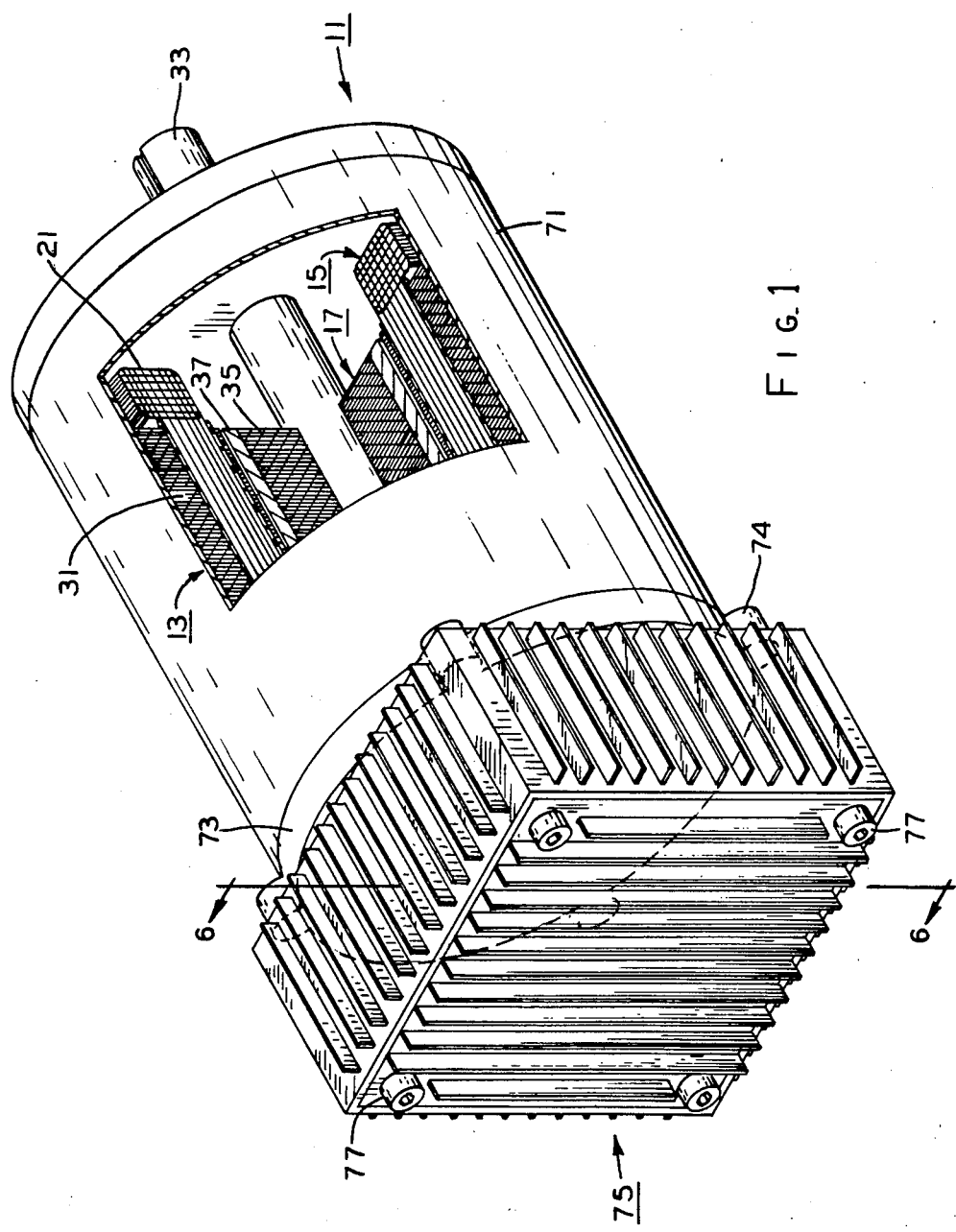
FIG. 1 is a partial sectional perspective view illustrating an ECM in one form of the invention.
Figure 5:
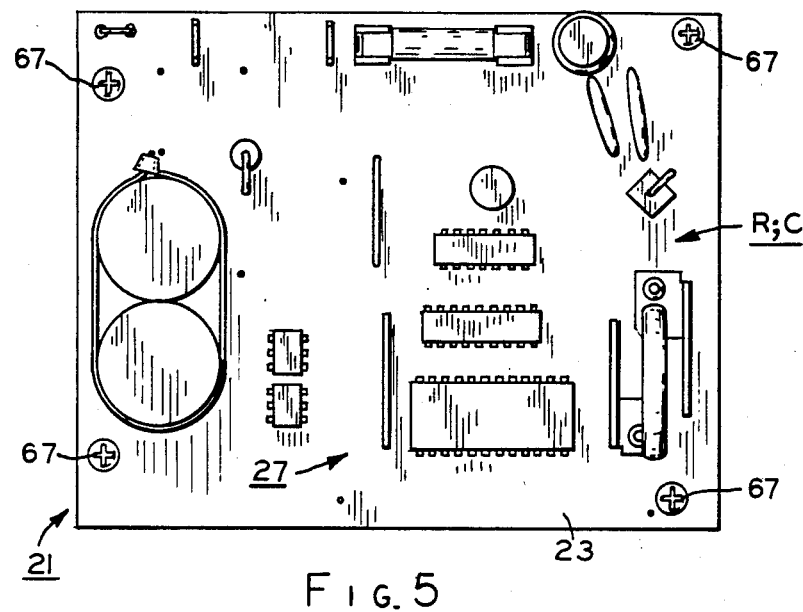
FIG. 5 is a top elevational view of the printed circuit board and heat dissipating support combination of FIG. 4.
Figure 4:
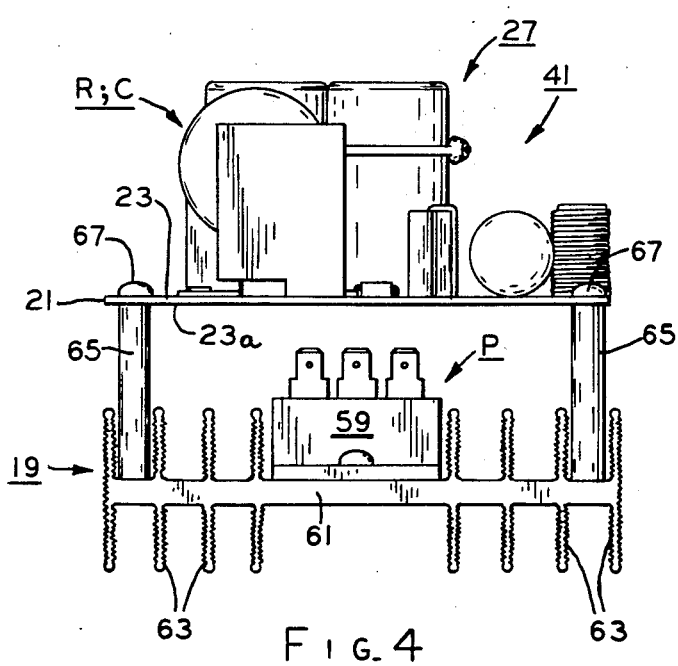
FIG. 4 is a front elevational view of a printed circuit board and a heat dissipating support combination utilized in the ECM and illustrating the placement thereon of at least some of the solid state components shown diagrammatically in the exemplary electronic circuitry of FIG. 3.
Figure 6:
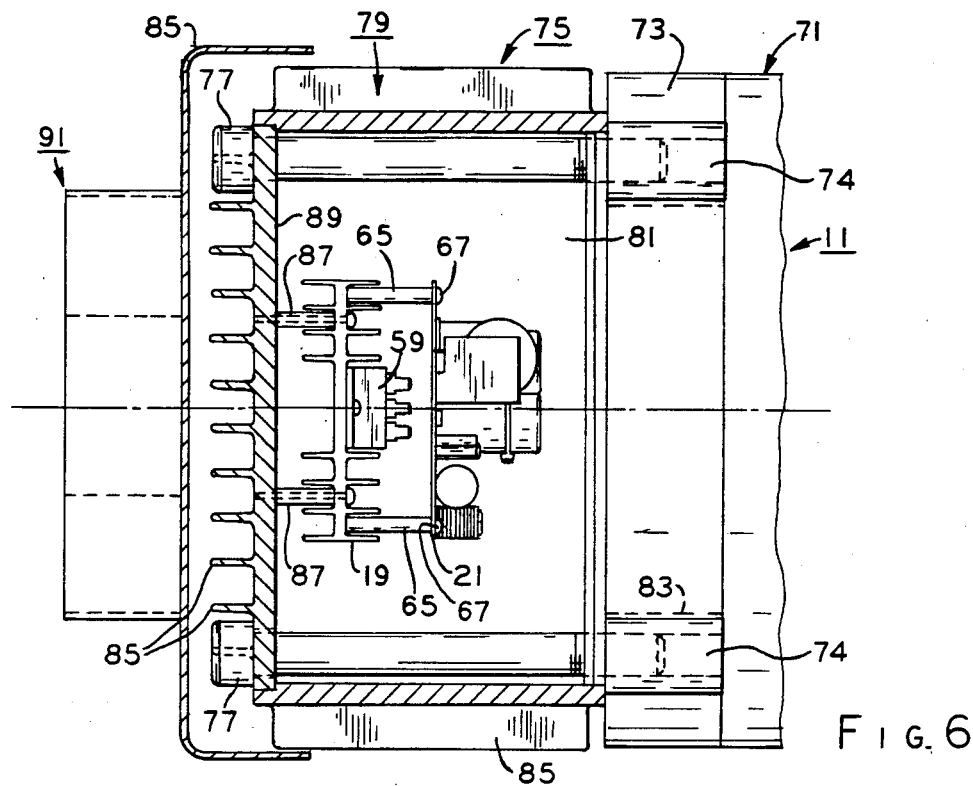
FIG. 6 is a partial sectional view taken along line 6—6 in FIG. 1 and also additionally showing the association with the ECM of an external blower device.

Referring now to the drawings in general, there is illustrated at 11 an electronically commutated motor (ECM) in one form of the invention, and the ECM has a stationary assembly 13 including a multi-stage winding arrangement 15 having a plurality of winding stages 15A, 15B, 15C adapted to be electronically commutated in at least one preselected sequence (FIGS. 1-3). A rotatable assembly 17 is associated with stationary assembly 13 and arranged in selective magnetic coupling relation with winding stages 15A-15C so as to be rotatably driven in response to the electronic commutation of at least some of the winding stages in the at least one preselected sequence to effect the circulation of cooling air in at least a part of ECM 11 (FIGS. 2, 3 and 6). Means, such as a support 19 or the like for instance, for dissipating heat is arranged at least in part in the path of at least some of the cooling air circulated by rotatable assembly 17 (FIGS. 4 and 6). A printed circuit board 21 is arranged in adjacent spaced apart relation with support or heat dissipating means 19 so as to be also disposed at least in part in the path of at least some of the cooling air circulated by rotatable assembly 17, and the printed circuit board includes a pair of generally opposite sides 23, 23a (FIGS. 4-6). Means, such as for instance electronic circuitry 25 or the like, is provided for controlling the electronic commutation of at least some of winding stages 15A-15C in the at least one preselected sequence, and the electronic circuitry or controlling means includes a plurality of solid state components, indicated generally at 27, connected in circuit relation with printed circuit board 21 (FIGS. 3-6). Some of solid state components 27 comprise switching devices 29A, 29B, 29C which may be insulated gate transistors located on support 19 in heat transfer relation therewith and spaced adjacent one opposite side 23 of printed circuit board 21, and other ones of the solid state components are located on the other opposite side 23a of the printed circuit board (FIGS. 4-6).

More particularly and with specific reference to FIGS. 1-6, stationary assembly 13 includes a core or stator 31 formed of a plurality of laminations of suitable ferromagnetic material arranged generally in face-to-face relation; however, it is contemplated that the stator may be of the edgewise wound type formed from a strip of such ferromagnetic material within the scope of the invention so as to meet at least some of the objects thereof. Rotatable assembly 17 includes a shaft 33, a core or rotor 35 disposed about the shaft, and a set of permanent magnet material elements 37 secured to the rotor with the rotor and permanent magnet material elements defining a permanent magnet rotor or rotor means. Albeit not shown for the sake of brevity of disclosure and drawing simplification, shaft 33 may be rotatably journaled by suitable bearings in at least one end frame or end shield of ECM 11. Further, while multistage winding arrangement 15 of ECM 11 is illustrated herein as having three winding stages 15A-15C for purposes of disclosure, it is contemplated that any convenient number of winding stages in excess of one may be employed in the ECM within the scope of the invention so as to meet at least some of the objects thereof. If a more detailed discussion of the construction and operation of an ECM, such as that indicated herein at 11, is desired reference may be had to U.S. Pat. No. 4,169,990 issued Oct. 2, 1979 to David M. Erdman which is incorporated herein by reference. Furthermore, while ECM 11 is illustrated herein with rotatable assembly 17 disposed at least in part within stationary assembly for convenience of disclosure, it is contemplated that an ECM having an inside-out stationary assembly— rotatable assembly construction may be employed in one form of the present invention so as to meet at least some of the objects thereof. If a more detailed discussion of an ECM having the aforementioned inside-out stationary assembly -rotatable assembly construction, reference may be had to the Franklin L. Forbes et al. U.S. application Ser. No. 796,779 filed Nov. 12, 1985 which is also assigned to the General Electric Company and which is incorporated herein by reference.

When electrical power is supplied to ECM 11, at least some of winding stages 15A-15C of the ECM are electronically commutated in the preselected sequence and at one of the commutation rates, and permanent magnet rotor 35, 37 is thereby associated in the aforementioned selective magnetic coupling relation with the electronically commutated winding stages so as to be rotatably driven thereby. Permanent magnet rotor 35, 37 rotates to at least a preselected speed in response to the electronically commutating action on the winding stages 15A-15C of ECM 11. As best seen in FIG. 3, electronic circuitry 25 for ECM 11 comprises a power circuit and a control circuit, the solid state components of which are contained within a dotted outlined box and indicated generally at P and C, respectively, and a regulating circuit, indicated generally at R, which generally includes the solid state components of the electronic circuitry other than those of the power and control circuits. In general, regulating circuit is connected across an AC power source and is operable to convert the AC power to DC power supplied to winding stages 15A-15C of ECM 11 and to maintain such supplied DC power generally constant. Switching devices 29A-29C of power circuit P are operable generally for commutating the power supplied to winding stages 15A-15C of ECM 11 by regulating circuit R, and control circuit C is operable generally for controlling the conductivity of switching devices 29-29A in power circuit P. Thus, electronic circuitry 25 comprises a means for controlling or effecting the electronic commutation of ECM 11, i.e., the electronic commutation of winding stages 15A-15C of the ECM. Albeit not shown herein for purposes of brevity of disclosure and drawing simplification, it may be noted that the various solid state components of electronic circuitry 25 are interconnected in circuit relation by printed circuit board 21, and it may be further noted that the solid state components of only control circuit C and regulating circuit R are located on the printed circuit board being mounted on opposite side 23a thereof, respectively. A more comprehensive explanation of the operation of electronic circuitry 25 for effecting the electronic commutation of ECM 11 is presented hereinafter; however, it is understood that such electronic circuitry is merely exemplary, and it is contemplated that various other electronic circuitry having different solid state components may be employed to effect the electronic commutation of the ECM within the scope of the invention so as to meet at least some of the objects thereof.

In the operation of electronic circuitry 25 to effect the energization of ECM 11, the angular velocity of permanent magnet rotor 35, 37 is regulated in accordance with a technique known as phase angle control. Zero crossovers of the 60 Hz line are detected and a signal is generated at a predetermined time interval thereafter, e.g., at a phase angle of 120°. The latter signal is applied to a regulator 43 which responds by turning on a switch or switching means, such as an SCR 45 or the like for instance. Thus, the signal applied at a terminal 47 which represents the desired performance of ECM 11, determines that power is to be supplied to winding stages 15A–15C during a time interval corresponding to a preselected phase angle, such as for instance a 60° phase angle. A capacitor 49 filters the signal at the output of SCR 45 to produce an effective voltage $V_m$ which is applied to winding stages 15A–15C. It will be seen therefore, that a DC voltage is applied only during a 60° interval under the assumed operating conditions. Thus, where phase control is employed, the angular velocity of permanent magnet rotor 35, 37 is controlled by preselecting the phase angle during which a DC voltage is applied to winding stages 15A–15C.

The control of the angular velocity of permanent magnet rotor 35, 37 may be further refined by means of voltage feedback, whereby $V_m$ is applied to regulator 43 for comparison against the signal derived from terminal 47. Since $V_m$ is representative of the actual angular velocity of permanent magnet rotor 35, 37, such velocity will vary with the difference between the compared signals. The resultant error signal is applied to SCR 45. If the amplitude of the error signal increases, SCR 45 is conductive for a longer time interval and ECM 11 speeds up; however, if it decreases, SCR 45 is open for a shorter time interval, and the drag on permanent magnet rotor 35, 37, e.g., due to friction and the load on the ECM, reduces the speed of ECM 11 until the desired angular velocity is reached.

The operation is not limited to the voltage feedback technique shown and discussed above. For example, a further way of providing closed loop regulation of the angular velocity of permanent magnet rotor 35 is to compare the signal at terminal 47 with the back EMF signals applied to a position sensing circuit 51 (or with a single combined back EMF signal) proportional to velocity of permanent magnet rotor 35, 37. In this manner the extraneous factors introduced by the resistance and inductance of winding stages 15A–15C is avoided, and a more closely regulated operation of the motor results.

The signal derived from a current shunt 53 is applied to commutation circuit 41 and thence to the base of each solid state switching device or commutation transistor 29A–29C as well as to regulator 43. While the regulation of $V_m$ is carried out by regulator 43 in the circuit illustrated, such action may not respond sufficiently quickly to an over-current condition. Accordingly, by applying the signal derived from current shunt 53 to the bases of commutation transistors 29A–29C via commutation circuit 41, immediate corrective action is effected by rendering these transistors nonconductive and thereby interrupting the energization of winding stages 15A–15C, as long as the over-current condition persists. By suitably adjusting the settings of regulator 43, the signal derived from current shunt 53 may be caused to take effect at a lower value with respect to the operation of SCR 45 than with respect to its direct application to commutation transistors 29A–29C. Thus, under normal operating conditions, regulator 43 and SCR 45 will have sufficient time to control ECM operation through the applied voltage $V_m$ when an overcurrent condition exists. Control through commutation transistors 29A–29C is thus reserved for extreme situations only. Preferably commutation transistors 29A–29C, comprise insulated gate transistors (IGT) which are operable to at least 230 volts and can interrupt at least 25 amperes.

For a more complete description of the arrangement and operation of electronic circuitry 25 of FIG. 3, reference may be had to U.S. Pat. No. 4,390,826 which is hereby incorporated by reference. As disclosed therein, electronic circuitry 25 operates in conjunction with position sensing circuit 51 for sensing the speed of permanent magnet rotor 35, 37 and for controlling the speed of a load (not shown) operatively connected thereto. Position sensing circuit 51 provides a means for measuring the speed of permanent magnet rotor 35, 37 by counting the commutation pulses derived from each of winding stages 15A–15C while ECM 11 is operated. These pulses may be counted for a measured period of time utilizing a timing circuit of a type well known in the art. Typically the control of commutation circuit 41 and other elements of electronic circuitry 25 will be implemented utilizing a microcomputer 55 which can be programmed to provide the correct signals necessary for operating the electronic circuitry system in response to either manual input commands, such as for instance commands for desired volumes of air from an ECM driven blower, or by actuating the electronic circuitry in response to particular rotational velocity commands. The microcomputer system (not shown) which may be of a type well known in the art includes the various timing apparatus necessary for establishing a time period over which the pulses provided by position sensing circuit 51 may be counted in order to determine the rotational speed of permanent magnet rotor 35, 37 of ECM 11.

As will be appreciated from the foregoing description, electronic circuitry 25 for ECM 11 contains numerous solid state components 29 for effecting the regulation of the speed or power output of the ECM. In higher power or heavier duty applications for ECM 11, such as for example those higher power applications discussed hereinbefore or the like, the power handling capability or conductivity capacity of switching devices 29A–29C is such that suitable heat dissipating means, such as support 19 for instance, must be thermally interconnected with the switching devices, and in many of the higher power applications, it is believed that power requirements may necessitate the use of six or more switching devices arranged in a full-wave bridge configuration.

Power circuit P of electronic circuitry 25 includes at least switching devices 29A–29C; however, albeit not shown for purposes of brevity of disclosure and drawing simplification, it is contemplated that the power circuit may include a diode bridge, six switching devices and six flyback diodes all arranged in power inverter configuration within the scope of the invention so as to meet at least some of the objects thereof, and it may be noted that the power circuit is secured to support 19 in heat transfer or heat sink relation therewith, as best seen in FIGS. 4 and 6. Means, such as a casing 59 or the like for instance, is provided for encasing the components of power circuit P, and the encasing means or casing may be formed of a suitable thermal conductive material. While casing 59 is secured by suitable means, such as screws or bolts or the like for instance, on support 19 in heat transfer or heat sink relation therewith, the casing is electrically insulated from the support by suitable means well known to the art.

Support 19 may be formed of any suitable thermal conductive material, such as for instance aluminum or the like, and the support includes a generally planar portion, such as for instance a plate 61 or the like, having a plurality of heat radiating fins 63 extending therefrom, as best seen in FIG. 4. Fins 63 serve to increase the heat dissipating surface area of support 19 thereby to increase its ability to dissipate the more intense heat generated by switching device 29A-29C in casing 59 which is, as previously mentioned, arranged in heat sink relation with the switching devices and the support. Means, such as a plurality of generally cylindric or tubular spacers 65 having elongate screws 67 passing therethrough, are provided for retaining support 19 and printed circuit board 21 in the adjacent spaced apart relation thereof. Thus, spacers 65 and screws 67 define with support 19 and printed circuit board 21 a mounting assembly or combination and also fixedly position the support in a plane generally parallel to opposite sides 23, 23a of the printed circuit board. While spacers 65 and screws 67 are illustrated herein for purposes of disclosure, it is contemplated that other means may be employed for mounting support 19 and printed circuit board 21 in the adjacent spaced apart relation thereof within the scope of the invention so as to meet at least some of the objects thereof.

ECM 11 is provided with a housing, such as a generally cylindric shell 71 for instance, within which stationary assembly 13 is disposed against displacement by suitable means well known to the art, such as press-fitting or welding or the like, and rotatable assembly 17 is, of course, associated with the stationary assembly within the housing, as best seen in FIG. 1. Albeit not shown, shaft 33 of rotatable assembly 17 may be rotatably journaled and supported by suitable bearing means in at least one of the opposite end frames or end shields mounted to the opposite ends of housing 71. As best seen in FIGS. 1 and 6, a flat faced end shield or adapter 73, having a plurality of rabbit-ear extensions 74 thereon is mounted to housing 71 at one opposite end thereof, and a thermally conductive enclosure or enclosure means, such as a housing 75 or the like for instance, is arranged in mounting and enclosing association with the flat faced end shield thereby to enclose the housing at the one opposite end thereof. A plurality of means, such as bolts 77 or the like for instance, extend through enclosure 75 into threaded engagement with rabbit-ear extensions 74 on flat faced end shield 73 so as to effect the mounting association therebetween; however, while the bolts are illustrated herein to mount the enclosure with housing 71, it is contemplated that other means may be employed to effect the mounting association of the enclosure and housing within the scope of the invention so as to meet at least some of the objects thereof.

Enclosure 75 may be formed of any suitable thermally conductive material, such as aluminum or the like for instance, and has a plurality of walls or wall means 79 for defining therewithin a chamber 81 which is communicated with the interior of housing 71 through an opening 83 in flat faced end shield 73; therefore, the chamber is subjected to at least some of the cooling air circulated within at least a part of the housing by the rotatable assembly upon the rotation thereof in response to the electronic commutation of at least some of winding stages 15A-15C when ECM 11 is energized. Of course, it is believed that heat generated by stator 31, winding stages 15A-15C and rotatable assembly 17 when ECM 11 is energized may be at least in part transmitted by the aforementioned cooling air circulation into enclosure chamber 81 into heat exchange relation with thermal conductive enclosure 75 thereby to be at least in part dissipated by the enclosure. To facilitate heat dissipation of enclosure 75, a plurality of thermal radiating fins 85 may be provided, if desired, on the exterior surface of the enclosure.

A plurality of means, such as threaded fasteners or standoffs 87 or the like for instance, are interconnected between an end wall 89 of enclosure 75 and support 19 for securing the assembly of the support and printed circuit board 21 in a preselected assembly position therefor within chamber 81 of the enclosure, and it may be noted that the standoffs also interconnect the support in heat sink relation with the enclosure. Of course, standoffs 87 may be formed of any suitable material having the desired structural strength and thermal conduction properties. While standoffs 87 are illustrated herein for purposes of disclosure, it is contemplated that other means may be utilized for mounting support 19 in heat sink relation to enclosure 75 within the scope of the invention so as to meet at least some of the objects thereof. It is also contemplated that support 19 may be mounted at least in part in abutment directly against end wall 89 of enclosure 75 within the scope of the invention so as to meet at least some of the objects thereof. With support 19 and printed circuit board 21 mounted in the spaced apart relation thereof within chamber 81 of enclosure 75, it may be noted that the support and printed circuit board are at least in part located in the path of the aforementioned cooling air circulated by rotatable assembly 17 and subjected to the enclosure chamber. Further, since the solid state components of control circuit C and regulating circuit R are predeterminately located on only opposite side 23a of printed circuit board 21 and casing 59 containing switching devices 29A-29C of power circuit P is located on support 19 in predetermined spaced apart relation from opposite side 23 of the printed circuit board, as previously mentioned, it may also be noted that the casing and the solid state components of the control and regulating circuits are also at least in part located in the path of the aforementioned cooling air circulated by rotatable assembly 17 and subjected to enclosure chamber 81. Thus, the more intense heat generated in power circuit P is not only transmitted to enclosure 75 through the heat sink connection of casing 59, support 19 and standoffs 87 to end wall 89 of the enclosure so as to be dissipated thereby but also by the aforementioned cooling air circulated in chamber 81 of the enclosure in heat transfer relation with the casing, support and standoffs, respectively. Of course, heat generated by the solid state components of control circuit C and regulating circuit R is also transferred therefrom to enclosure 75 by the aforementioned cooling air circulated in enclosure chamber 81 thereby to be dissipated by the enclosure. In view of the foregoing, it is believed that the more intense heat generated by switching devices 29A-29C of power circuit P contained in casing 59 is adequately dissipated so as to obviate any deleterious effect of such generated heat on the solid state components of control circuit C and regulating circuit R.

If desired, a blower or blower means 91 may be mounted by suitable means, such as screws or the like for instance (not shown), to end wall 89 of enclosure 75 exteriorly thereof for effecting forced air circulation over at least a part of the exterior surface of the enclosure thereby to enhance the heat dissipation capacity of the enclosure. Blower means 91 is a TF 120 Series ball bearing fan available from the U.S. Toyo Corp. of San Gabriel, Calif. Further, it may be noted that at least some of thermal radiating fins 85 on enclosure 75 are oriented so as to extend in a direction at least generally parallel to the flow of the forced air circulated by blower means 91 exteriorly over the enclosure.

Figure 7:
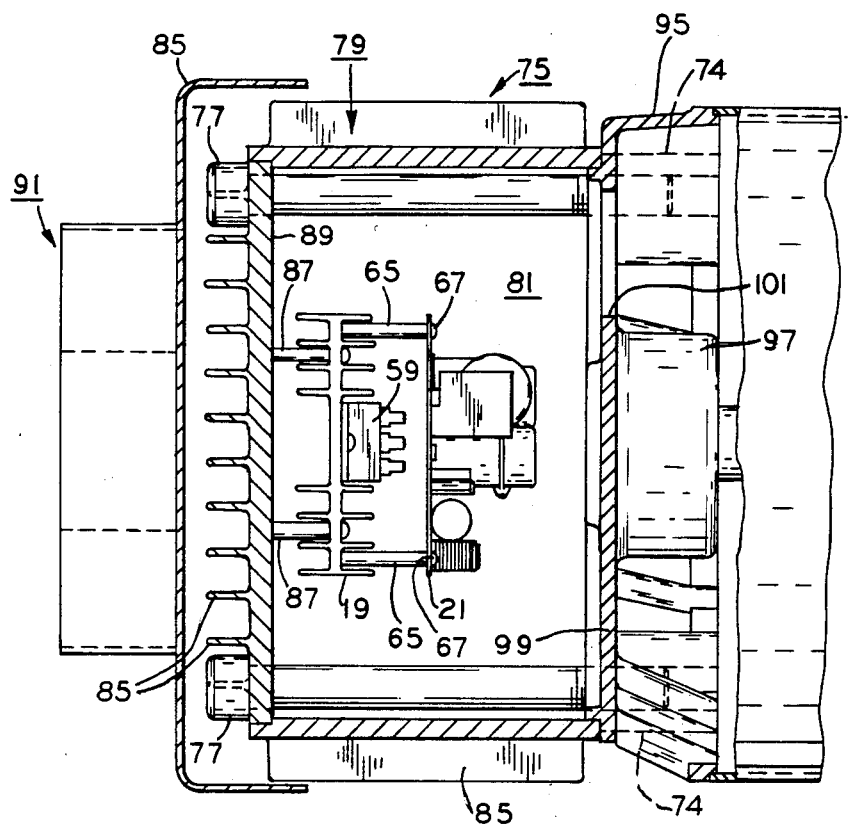
FIG. 7 is a partial sectional view of an alternative ECM in one form of the invention.

An alternative ECM 93 is shown in one form of the invention in FIG. 7 having generally the same component parts and functioning generally in the same manner as the previously discussed ECM with the exceptions noted hereinafter. While alternative ECM 93 meets at least some of the objects set out above, it is believed that the alternative ECM also has indigenous objects and advantageous features as will be in part apparent and in part pointed out in the following discussion.

Figure 8:
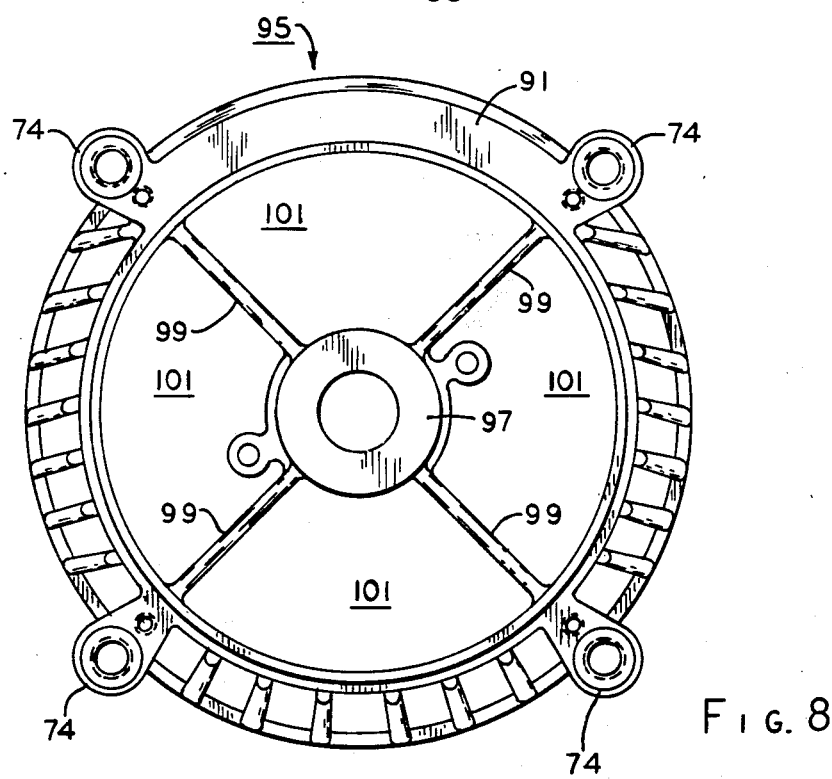
FIG. 8 is a front elevational view of one of the end shields of the ECM of FIG. 7.

In ECM 93, the previously discussed flat faced end shield 73 is replaced by another end shield 95, as also illustrated in FIG. 8. While end shield 95 includes the same rabbit-ear extensions 74 as previously discussed with respect to end shield 73, the end shield 95 further includes a central hub 97 in which shaft 33 of rotatable assembly 17 may be rotatably journaled and supported, and a plurality of arms or ribs 99 integral with end shield 95 extend generally radially outwardly from the central hub to form a plurality of passages or openings 101 between the arms. Of course, the aforementioned cooling air circulated by rotatable assembly 17 is passed from within housing 71 through openings 101 into chamber 81 of enclosure 75 secured to end shield 95. The securement of enclosure 75 to end shield 95 is effected by bolts 77 extending through the enclosure into threaded engagement with rabbit-ear extensions 74 on the end shield.

Figure 9:
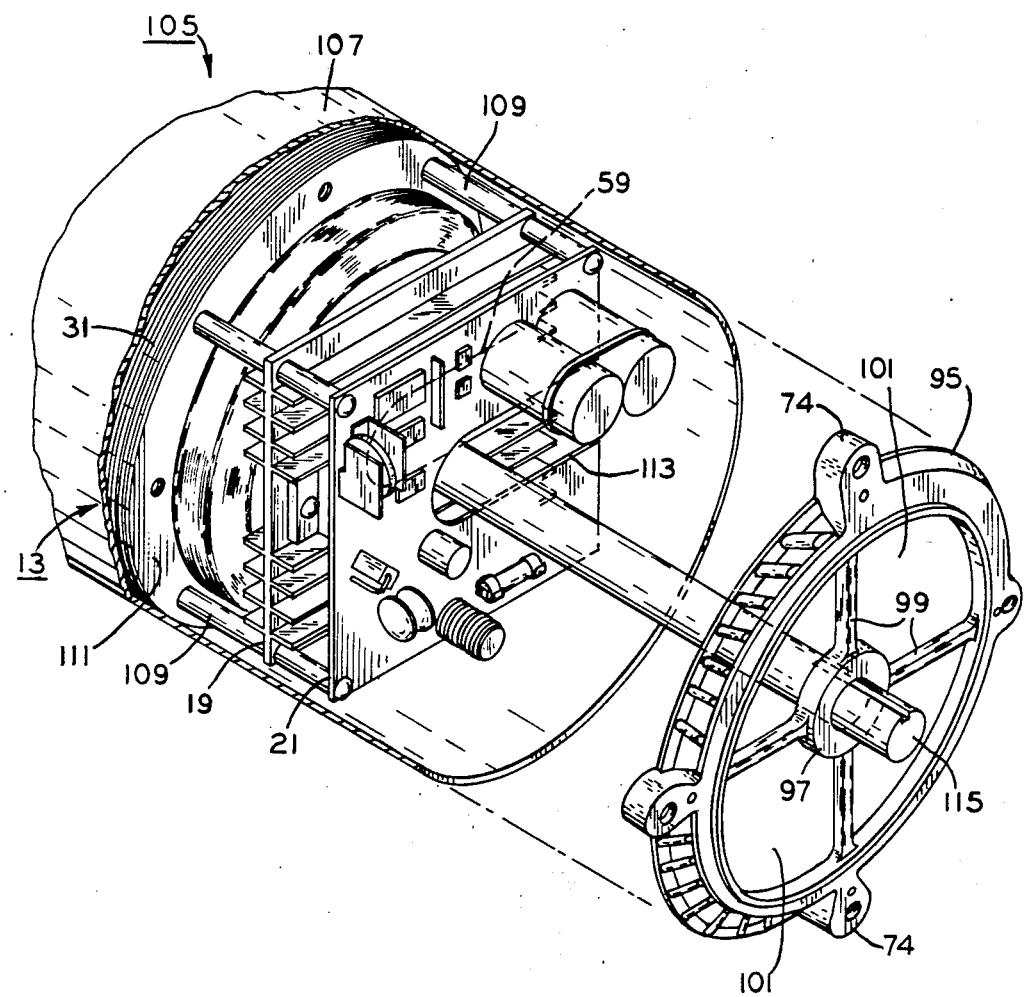
FIG. 9 is partial exploded perspective view of another alternative ECM in one form of the invention with a part of the housing thereof broken away for clarity.

In FIG. 9, another alternative ECM 105 is illustrated in one form of the invention having generally the same component parts and functioning generally in the same manner as the previously discussed ECM 11 with the exceptions noted below. While alternative ECM 105 meets at least some of the objects set out hereinbefore, it is believed that alternative ECM also has indigenous objects and advantageous features as will be in part apparent and in part pointed out hereinafter.

In ECM 105, electronic circuitry 25 is located within a housing, such as for instance a cylindric shell 107 or the like, of the ECM and end shield 95 is mounted to the housing at one opposite end thereof. The assembly of support 19 and printed circuit board 21 in the spaced apart relation thereof is mounted by suitable mounting means 109 to stator 31 so as to extend generally in cantilevered relation from an end face 111 of the stator, and the stator is, of course, disposed within housing 107 of ECM 105 against displacement by suitable means, such as press-fitting as welding or the like for instance. Of course, mounting means 109 may be formed of any suitable material having the desired structural strength and heat conduction characteristics. If desired, an opening 113 may be provided through each of support 19 and printed circuit board 21 in the assembly thereof to receive a shaft extension 115 in end shield 95. With electronic circuitry 25 so located within housing 107 of ECM 105, it is believed that the ECM is more compact, and it is also believed that the ECM has the advantage of more efficiently utilizing the aforementioned cooling air caused to be circulated within the ECM housing by the rotation of rotatable assembly 17 when the ECM is energized. This cooling air is drawn through openings 101 in end shield 95 passing over and around electronic circuitry 25 on support 19 and printed circuit board 21, and it is believed that the mass of the ferromagnetic material in stator 31 defines a heat sink connection with mounting means 109 for the support thereby to assist in the dissipation of heat generated by the electronic circuitry. Instead of securing mounting means 109 to stator end face 111 thereby to locate support 19 and printed circuit board 21 within housing 107 of ECM 105, it is contemplated that the mounting means may be secured to end shield 95 to effect the location of the support and printed circuit board in the ECM housing within the scope of the invention so as to meet at least some of the objects thereof.

From the foregoing, it is now apparent that the improved and novel ECMs 11, 93, 105 have been presented meeting the objects set out thereinbefore, as well as others, and it is contemplated that changes as to the precise arrangement, shapes, details and connections of the component parts of the ECMs may be made by those having ordinary skill in the art without departing from the spirit of the invention or from the scope thereof as set out in the claims which follow.

What we claim as new and desire to secure by Letters Patent of the United States is:

1. An electronically commutated motor adapted for energization from a source of power to drive a load, the electronically commutated motor comprising:

a housing having at least one end shield with at least one opening therethrough;

a stator disposed in said housing;

a multi-stage winding arrangement associated with said stator and including a plurality of winding stages adapted to be electronically commutated in at least one preselected sequence;

permanent magnet rotor means associated with said stator and arranged in selective magnetic coupling relation with said winding stages and rotatable for driving the load and for effecting a circulation of cooling air through at least a part of said housing and said at least one opening in said at least one end shield upon the electronic commutation of at least some of said winding stages in the at least one preselected sequence;

solid state electronic circuitry connected in circuit relation with said multi-stage winding arrangement and including a plurality of insulated gate transistors operable to commutate the power supplied from the source thereof to said multi-stage winding arrangement upon the energization of the electronically commutated motor, and solid state circuit means operable generally for controlling the magnitude of the power supplied to said winding stages and the conductivity of said insulated gate transistors thereby to effect the electronic commutation of said at least some winding stages in the at least one preselected sequence and the rotation of said permanent magnet rotor means to drive the load, the heat generated by said insulated gate transistors, said circuit means, said winding stages, said permanent magnet rotor means and said stator upon the energization of the electronically commutated motor being a function of the load driven by said permanent magnet rotor means;

an enclosure mounted to said at least one end shield and formed of a thermally conductive material so as to dissipate at least some of the heat generated upon the energization of the electronically commutated motor, said enclosure including a plurality of wall means for defining therein a chamber communicated with said at least one opening in said at least one end shield so as to receive at least some of the cooling air circulated by said permanent magnet rotor means through said at least one opening;

a support formed of a thermally conductive material and mounted in heat sink relation to one of said wall means of said enclosure within said chamber thereof thereby to be disposed at least in part in the path of the circulated cooling air received in said chamber;

a printed circuit board mounted to said support within said chamber and connecting said solid state circuit means and said insulated gate transistors in circuit relation, said printed circuit board including a pair of generally opposite sides, one of said opposite sides being arranged at least in part generally in facing and spaced apart relation with said support and the other of said opposite sides supporting thereon said circuit means, and said printed circuit board and said circuit means being at least in part disposed in the path of the circulated cooling air received in said chamber; and a casing formed of a thermally conductive material and encasing in heat transfer relation therein at least said insulated gate transistors, said casing being engaged in heat sink relation with said support and arranged at least generally adjacent said one opposite face of said printed circuit board so as to be disposed at least in part in the path of the circulated cooling air received in said chamber.

2. An electronically commutated motor adapted for energization from a source of power to drive a load, the electronically commutated motor comprising:

a housing including at least one end;

a stator disposed in said housing;

a multi-stage winding arrangement associated with said stator and having a plurality of winding stages adapted to be electronically commutated in at least one preselected sequence;

permanent magnet rotor means associated with said stator so as to be arranged in selective magnetic coupling relation with said winding stages and rotatable for driving the load and for effecting a circulation of cooling air in at least a part of said housing upon the electronic commutation of at least some of said winding stages in the at least one preselected sequence;

a solid state electronic circuit connected in circuit relation with said multi-stage winding arrangement and including a plurality of solid state switching devices operable generally for commutating the power supplied from the source thereof to said multi-stage winding arrangement upon the energization of the electronically commutated motor, and solid state circuit means operable generally for controlling the magnitude of the power supplied to said multi-stage winding arrangement and for controlling the conductivity of said switching devices thereby to effect the electronic commutation of said at least some winding stages in the at least one preselected sequence and the rotation of said permanent magnet rotor means to drive the load and circulate the cooling air, the heat generated by said switching devices, said circuit means, said winding stages, said permanent magnet rotor means and said stator upon the energization of the electronically commutated motor being a function of the load driven by said permanent magnet rotor means;

said housing further including heat dissipating enclosure means mounted thereto for enclosing said at least one end of said housing, and a chamber in said heat dissipating enclosure means subjected to at least some of the cooling air circulated by said permanent magnet rotor means;

heat dissipating support means mounted in heat sink relation to said heat dissipating enclosure means within said chamber and subjected to the at least some cooling air therein, and said switching devices being arranged on said heat dissipating support means in heat transfer relation therewith, respectively;

a printed circuit board connecting said switching devices and circuit means in circuit relation and mounted adjacent said heat dissipating support means within said chamber so as to be subjected to the at least some cooling air therein, and said circuit means being arranged on said printed circuit board with said printed circuit board being interposed between said circuit means and said switching devices arranged on said heat dissipating support means.

3. An electronically commutated motor comprising:

a housing;

a stator in said housing;

a multi-stage winding arrangement associated with said stator and including a plurality of winding stages adapted to be electronically commutated in at least one preselected sequence;

a permanent magnet rotor associated with said stator and arranged in selective magnetic coupling relation with said winding stages so as to be rotatably driven in response to the electronic commutation of at least some of said winding stages in the at least one preselected sequence;

solid state electronic circuitry connected in circuit relation with said multi-stage winding arrangement and including a plurality of solid state switching devices operable generally for commutating power supplied to said winding stages, and solid state circuit means for controlling the power supplied to said winding stages and the conductivity of said switching devices, said switching devices, said circuit means, said permanent magnet rotor, said stator and said multi-stage winding arrangement being operable to generate heat upon the electronic commutation of said at least some winding stages in the at least one preselected sequence;

means for mounting said switching devices and said circuit means in heat dissipating relation to the electronically commutated motor, said mounting means including another housing of thermally conductive material and adapted to mate with said first named housing, a plurality of side walls and an end wall on said another housing defining therein a chamber in which said switching devices and said circuit means are mounted in heat exchange relation; and a mounting assembly positioned within said another housing and including a printed circuit board supporting said circuit means and connecting said electronic circuitry in circuit relation, and heat dissipating means for supporting at least said switching devices in spaced apart relation from said printed circuit board, said heat dissipating means being arranged in heat transfer relation with said switching devices and said another housing and said switching devices being electrically insulated from said heat dissipating means, respectively.

4. The electronically commutated motor as set forth in claim 3 wherein said another housing includes a plurality of means on an exterior surface thereof for radiating heat, respectively.

5. The electronically commutated motor as set forth in claim 3 further comprising blower means associated with said another housing for effecting a forced air circulation over at least a part of said another housing exteriorly thereof.

6. The electronically commutated motor as set forth in claim 3 wherein said switching devices comprise a plurality of insulated gate transistors.

7. The electronically commutated motor as set forth in claim 3 further comprising means for encasing at least said switching devices, said encasing means being arranged in heat transfer relation between said switching devices and said heat dissipating means, respectively.

8. An electronically commutated motor comprising:
a housing including at least one end;
a stator in said housing;
a multi-stage winding arrangement associated with said stator and including a plurality of winding stages adapted to be electronically commutated in at least one preselected sequence;
a permanent magnet rotatable assembly associated with said stator so as to be arranged in selective magnetic coupling relation with said winding stages and rotatable in response to the electronic commutation of at least some of said winding stages in the at least one preselected sequence to effect a circulation of cooling air through at least a part of said housing;
a thermally conductive enclosure mounted to said housing and enclosing said at least one end of said housing;
means for dissipating heat secured in heat sink relation to said thermally conductive enclosure therewithin and disposed at least in part in the path of at least some of the cooling air circulated by said permanent magnet rotatable assembly;
a printed circuit board mounted in adjacent spaced relation with said heat dissipating means and disposed at least in part in the path of the at least some cooling air circulated by said permanent magnet rotatable assembly, and said printed circuit board including a pair of generally opposite sides; and
means for controlling the electronic commutation of said winding stages and including a plurality of solid state components connected in circuit relation with said printed circuit board, some of said solid state components comprising a plurality of insulated gate transistors arranged on said heat dissipating means in heat transfer relation therewith and spaced adjacent one of said opposite sides of said printed circuit board, and the rest of said solid state components being mounted to the other of the opposite sides of said printed circuit board respectively.

9. The electronically commutated motor as set forth in claim 8 further comprising means for encasing at least said insulated gate transistors, said encasing means being arranged in heat transfer relation with said insulated gate transistors and being engaged in heat sink relation with said heat dissipating means.

10. The electronically commutated motor as set forth in claim 8 further comprising blower means mounted to an exterior part of said thermally conductive enclosure for effecting a forced air circulation over said thermally conductive enclosure exteriorly thereof.

11. The electronically commutated motor as set forth in claim 10 wherein said thermally conductive enclosure includes a plurality of thermal radiating fins on said thermally conductive enclosure exteriorly thereof with at least some of said thermal radiating fins being oriented in a direction at least generally parallel to the direction of the flow of the forced air circulated by said blower means.

12. An electronically commutated motor comprising:
a stationary assembly including a multi-stage winding arrangement having a plurality of winding stages adapted to be electronically commutated in at least one preselected sequence;
a rotatable assembly associated with said stationary assembly and arranged in selective magnetic coupling relation with said winding stages so as to be rotatably driven in response to the electronic commutation of at least some of said winding stages in the at least one preselected sequence to effect a circulation of cooling air in at least a part of the electronically commutated motor;
means for dissipating heat arranged at least in part in the path of at least some of the cooling air circulated by said rotatable assembly;
a printed circuit board arranged in adjacent spaced apart relation with said heat dissipating means and at least in part in the path of the at least some cooling air circulated by said rotatable assembly, said printed circuit board including a pair of generally opposite sides; and
means for controlling the electronic commutation of said winding stages in at least the at least one preselected sequence and including a plurality of solid state components connected in circuit relation with said printed circuit board, some of said solid state components comprising insulted gate transistors located on said heat dissipating means in heat transfer relation therewith and spaced adjacent one of the opposite sides of said printed circuit board and other ones of said solid state components being located on the other of said opposite sides of said printed circuit board, respectively.

13. The electronically commutated motor as set forth in claim 12 further comprising means for encasing at least said insulated gate transistors, said encasing means being arranged in heat transfer relation with said insulated gate transistors and engaged in heat sink relation with said heat dissipating means, respectively.

14. The electronically commutated motor as set forth in claim 12 further comprising means for mounting said heat dissipating means and said printed circuit board in the spaced apart relation thereof to said stationary assembly within the electronically commutated motor.

15. The electronically commutated motor as set forth in claim 12 further comprising thermally conductive enclosure means for securement to the electronically commutated motor and having a chamber subjected to the at least some cooling air circulated by said rotatable assembly, and means for mounting said heat dissipating means and said printed circuit board in the spaced apart relation thereof to said thermally conductive enclosure means within said chamber thereof and for interconnecting said heat dissipating means in heat sink relation with said thermally conductive enclosure means.

16. The electronically commutated motor as set forth in claim 15 further comprising blower means mounted to said thermally conductive enclosure means exteriorly thereof for effecting a forced air circulation over said thermally conductive enclosure means exteriorly thereof.

17. The electronically commutated motor as set forth in claim 16 wherein said thermally conductive enclosure means includes a plurality of thermal radiating fins extending externally thereof and with at least some of said thermal radiating fins being oriented in a direction at least generally parallel to the direction of the flow of the forced air circulated by said blower means, respectively.

18. An electronically commutated motor comprising:
a housing having at least one end;
an end shield mounted to said at least one end of said housing and including at least one opening therethrough;
a stationary assembly disposed in said housing and spaced apart from said end shield, said stationary assembly including a multi-stage winding arrangement having a plurality of winding stages adapted to be electronically commutated in at least one preselected sequence;
a rotatable assembly associated with said stationary assembly and arranged in selective magnetic coupling relation with said winding stages so as to be rotatably driven in response to the electronic commutation of at least some of said winding stages in the at least one preselected sequence to effect circulation of cooling air within said housing at least between said stationary assembly and said end shield;
means for dissipating heat;
a printed circuit board including a pair of generally opposite sides;
means for controlling the electronic commutation of said winding stages in at least the at least one preselected sequence and including a plurality of solid state components connected in circuit relation with said printed circuit board, some of said solid state components comprising a plurality of insulated gate transistors located on said heat dissipating means in heat transfer relation therewith and spaced adjacent one of said opposite sides of said printed circuit board and other ones of said solid state components being located on the other of said opposite sides of said printed circuit board; and
means for mounting said heat dissipating means in heat sink relation with said stationary assembly within said housing between said stationary assembly and said end shield and for retaining said heat dissipating means and said printed circuit board in spaced apart relation.

* * * * *